United States Patent
Deligne et al.

(10) Patent No.: US 7,319,955 B2
(45) Date of Patent: Jan. 15, 2008

(54) AUDIO-VISUAL CODEBOOK DEPENDENT CEPSTRAL NORMALIZATION

(75) Inventors: Sabine Deligne, New York, NY (US); Chalapathy V. Neti, Yorktown Heights, NY (US); Gerasimos Potamianos, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 764 days.

(21) Appl. No.: 10/307,164

(22) Filed: Nov. 29, 2002

(65) Prior Publication Data

US 2004/0107098 A1 Jun. 3, 2004

(51) Int. Cl.
G10L 15/00 (2006.01)
(52) U.S. Cl. .................................................... 704/233
(58) Field of Classification Search ................... None
See application file for complete search history.

(56) References Cited

U.S. PATENT DOCUMENTS

| | | | | |
|---|---|---|---|---|
| 4,449,189 A * | 5/1984 | Feix et al. | ........... | 704/272 |
| 4,757,541 A * | 7/1988 | Beadles | ........... | 704/254 |
| 5,412,738 A * | 5/1995 | Brunelli et al. | ........... | 382/115 |
| 5,621,858 A * | 4/1997 | Stork et al. | ........... | 704/232 |
| 6,594,629 B1* | 7/2003 | Basu et al. | ........... | 704/251 |
| 2002/0113687 A1* | 8/2002 | Center et al. | ........... | 340/5.82 |
| 2002/0116197 A1* | 8/2002 | Erten | ........... | 704/273 |

OTHER PUBLICATIONS

Deligne et al., "Audio-visual speech enhancement with AVCDCN", Sensor Array and Multichannel Signal Processing Workshop Proceedings, Aug. 4-6, 2002 pp. 68-71.*
Girin et al., "Audiovisual speech enhancement: new advances using multi-layer perceptrons", IEEE Second Workshop on Multimedia Signal Processing, Dec. 7-9, 1998 pp. 77-82.*
Girin et al., "Fusion if auditory and visual information for noisy speech enhancement: a preliminary study of vowel transitions", Proceedings of the 1998 IEEE International Conference on Acoustics, Speech, and Signal Processing, vol. 2, May 12-15, 1998 pp. 1005-1008.*
Deng et al., "High-Performance Robust Speech Recognition Using Stereo Training Data", Proceedings of ICASSP 2001, May 2001.
Potamianos et al., "Hierarchical Discriminant Features for Audio-Visual LVCSR", Proceedings of ICASSP 2001, May 2001.
Neti et al., "Audio-Visual Speech Recognition, Final Workshop Report", Center for Language and Speech Processing, 2000.
Acero et al., "Environmental Robustness in Automatic Speech Recognition", Proceedings of ICASSP'90, pp. 849-852, 1990.
Acero, Acoustical and Environmental Robustness in Automatic Speech Recognition, PhD thesis, Dept. of Elec. and Comp. Engineering, CMU, Pittsburgh, PA 15213, Sep. 1990.

(Continued)

*Primary Examiner*—David Hudspeth
*Assistant Examiner*—Brian L. Albertalli
(74) *Attorney, Agent, or Firm*—Ference & Associates LLC (57) ABSTRACT

An arrangement for yielding enhanced audio features towards the provision of enhanced audio-visual features for speech recognition. Input is provided in the form of noisy audio-visual features and noisy audio features related to the noisy audio-visual features.

21 Claims, 4 Drawing Sheets

OTHER PUBLICATIONS

Girin et al., "Audio-Visual Enhancement of Speech in Noise", Journal of the Accoustical Society of America, vol. 6, n. 109, pp. 3007-3020, 2001.

Goecke et al., "Noisy Audio Feature Enhancement Using Audio-Visual Speech Data", Proceedings of ICASSP'02, 2002.

L. Rabiner et al., Fundamentals of Speech Recognition, Prentice Hall Signal Processing Series, Chapter 3, 1993.

Bahl et al., Performance of the IBM Large Vocabulary Continuous Speech Recognition System on the ARPA Wall Street Journal Task, Proc. of ICASSP 1995, vol. 1, pp. 41-45, 1995.

* cited by examiner

AUDIO-VISUAL CODEBOOK DEPENDENT CEPSTRAL NORMALIZATION

FIELD OF THE INVENTION

The present invention generally relates to the use of visual information for speech recognition in noisy environments. More particularly, the present invention relates to the enhancement of noisy speech features using a combination of audio and visual features.

BACKGROUND OF THE INVENTION

Robustness in the presence of noise is a crucial issue normally addressed in connection with speech recognition, especially when performance in a real-world environment is concerned.

In cases where the noise corrupting the speech is stationary and where its characteristics are known in advance, robustness issues can, to a certain extent, be addressed during the training of the speech recognition system. Particularly, the acoustic model of the speech recognition system can be trained on a representative collection of noisy data; this approach is known as "multi-style training" and has been shown to reduce the degradation of the recognition accuracy in the presence of noise. However, in most applications, the noise corrupting the speech is neither accurately known in advance nor completely stationary. In such cases on-line compensation algorithms provide better performances than multi-style training.

To date, various efforts have been made in the contexts just described, yet various shortcomings and disadvantages have been observed.

Conventionally, on-line algorithms that aim at enhancing speech corrupted by environmental noise are audio-only approaches; they process the noisy speech signal using audio information only. The Codebook Dependent Cepstral Normalization (CDCN) approach (See Alejandro Acero, "Acoustical and Environmental Robustness in Automatic Speech Recognition", PhD thesis, Department of Electrical and Computer Engineering, Carnegie Mellon University, Pittsburgh, Pa. 15213, September 1990), and the SPLICE approach (See Li Deng, Alex Acero, Li Jiang, Jasha Droppo and Xuedong Huang, "High-performance Robust Speech Recognition Using Stereo Training Data", in the Proceedings of the International Conference on Acoustics Speech and Signal Processing (ICASSP) 2001, May 2001) are examples of non linear audio-only approaches. In these approaches, a non linear compensation term is estimated from the observed noisy speech features and by using some a priori information or on-the-fly estimate of the characteristics of the corrupting noise. The estimated compensation term is then combined with the observed noisy features to produce an estimate of the clean speech features. Since usually all the audio information that is available is affected by the noise and since the exact characteristics of the noise are usually not known with accuracy, the estimation of the compensation term can be a very arduous problem.

On the other hand, the visual data that can be obtained from the mouth area of the speaker's face and that carry information on the movements of the speaker's lips can be expected to be relatively unaffected by environmental noise. Audio-visual speech recognition where both an audio channel and a visual channel are input to the recognition system, has already been demonstrated to outperform traditional audio-only speech recognition in noise conditions (See C. Neti, G. Potamianos, J. Luettin, I. Matthews, H. Glotin, D. Vergyri, J. Sison, A. Mashari and J. Zhou, "Audio-visual speech recognition, final workshop report", Center for Language and Speech Processing, 2000. And see G. Potamianos, C. Neti and J. Luettin, "Hierarchical discriminant features for audio-visual LVCSR", Proceedings of ICASSP2001, May 2001). Audio-visual speech recognition is more robust than audio-only speech recognition in the presence of noise as it is making use of visual information which is correlated with the phonetic content of the speech and which is relatively unaffected by noise. However audio-visual speech recognition does not explicitly address the problem of compensating for the effect of noise on speech, i.e., it does not enhance the noisy audio features.

In addition to audio-visual speech recognition, a visual modality is also being investigated as a medium of speech enhancement, where clean audio features are estimated from audio-visual speech when the audio channel is corrupted by noise; see L. Girin, J. L. Schwartz and G. Feng, "Audio-visual enhancement of speech in noise", Journal of the Acoustical Society of America, vol. 6, n. 109, pp. 3007-3020, 2001, and also R. Goecke, G. Potamianos and C. Neti, "Noisy audio feature enhancement using audio-visual speech data", Proceedings of ICASSP'02, 2002. In both these works, audio-visual enhancement relies on a training phase with a stereo training database consisting of clean audio features in the first channel and of noisy audio features and visual features in the second channel. The noisy audio data in the second channel are generated by adding noise to the waveform of the clean audio features contained in the first channel. The training procedure involves estimating a transfer function between the noisy audio-visual features in the first channel and the clean audio features in the second channel. Girin et al. experiment with a transfer function that is either a linear filter or a non linear associator. The enhancement provided by either transfer function is assessed on a simplistic task of audio-only speech recognition of a vowel-plosive-vowel test corpus with a single speaker. Girin et al. appear to disclose that enhancing the noisy audio-visual data with the linear filter improves the speech recognition accuracy of the vowels but results in a lower recognition accuracy of the consonants. Girin et al. also set forth that enhancing the noisy audio-visual data with the non linear transfer function instead of the linear transfer function provides a better improvement on the vowel recognition task but that it does not provide any clear improvement on the consonant recognition task.

In Goecke et al., supra, the transfer function is a linear filter. The enhancement provided by the transfer function is assessed on an automatic speech recognition task. Goecke et al. set forth that enhancing the noisy audio-visual data with the linear filter results in a better speech recognition accuracy than not enhancing the data in the case where the data are decoded with an audio-only speech recognizer. Further, Goecke et al. set forth that enhancing the noisy audio-visual data with the linear filter and decoding the enhanced data with an audio-only speech recognizer results in a speech recognition accuracy that is significantly worse than the accuracy obtained by decoding non-enhanced data with an audio-visual speech recognizer. In other words, the performance of audio-visual speech enhancement combined with audio-only speech recognition remains significantly inferior to the performance of audio-visual speech recognition alone.

In conclusion, audio-visual speech enhancement techniques have an advantage over audio-only speech enhancement techniques in that the visual modality provides information that is not affected by environmental noise. However, linear approaches to audio-visual speech enhancement make the assumption of a linear coupling between the noisy audio-visual features and the clean audio features. This assumption of linearity is somehow arbitrary and may not be a valid assumption. Non-linear approaches to speech enhancement have thus far been very little investigated and so far have not been reported to be successful even on very simple and controlled speech recognition tasks. More generally, state-of-the-art approaches to audio-visual speech enhancement so far have not provided gains in recognition accuracy over state-of-the-art approaches to audio-visual speech recognition, even though audio-visual speech recognition does not explicitly address the problem of compensating for the effect of noise on speech.

In view of the foregoing, a need has been recognized in connection with improving upon the shortcomings and disadvantages of conventional efforts.

SUMMARY OF THE INVENTION

In accordance with at least one presently preferred embodiment of the present invention, there is proposed an audio-visual speech enhancement technique, which may be referred to as "Audio-Visual Codebook Dependent Cepstral Normalization" (AVCDCN) and which, when combined with audio-only speech recognition, outperforms audio-visual speech recognition of non-enhanced noisy speech. AVCDCN and related concepts that are presently contemplated are provided in greater detail further below.

An advantage associated with embodiments of the present invention, in comparison with audio-only approaches to speech enhancement, is that visual information is utilized which, unlike the audio information, is relatively unaffected by environmental noise. An advantage over linear approaches to audio-visual speech enhancement may be found in that no assumption is made of a linear transfer function between noisy audio-visual features and clean audio features. An advantage over state-of-the-art linear and non linear approaches to audio-visual speech enhancement may be found in that the utilization of visual information is at least as efficient as state-of-the-art approaches to audio-visual speech recognition. Indeed, as will be appreciated herebelow, AVCDCN combined with audio-only speech recognition provides a better recognition accuracy than audio-visual speech recognition.

In summary, one aspect of the present invention provides an apparatus for enhancing speech for speech recognition, the apparatus comprising: a first input medium which obtains noisy audio-visual features; a second input medium which obtains noisy audio features related to the noisy audio-visual features; and an arrangement for yielding enhanced audio features towards the provision of enhanced audio-visual features for speech recognition.

Another aspect of the present invention provides a method of enhancing speech for speech recognition, the method comprising the steps of: obtaining noisy audio-visual features; obtaining noisy audio features related to the noisy audio-visual features; and yielding enhanced audio features towards the provision of enhanced audio-visual features for speech recognition.

Furthermore, an additional aspect of the present invention provides a program storage device readable by machine, tangibly embodying a program of instructions executable by the machine to perform method steps for enhancing speech for speech recognition, the method comprising the steps of: obtaining noisy audio-visual features; obtaining noisy audio features related to the noisy audio-visual features; and yielding enhanced audio features towards the provision of enhanced audio-visual features for speech recognition.

DESCRIPTION OF THE PREFERRED EMBODIMENTS

Generally, it is contemplated that AVCDCN will operate on cepstral speech features. A cepstra (see chapter 3 in L. Rabiner and B. H. Juang, *Fundamentals of Speech Recognition*, Prentice Hall Signal Processing Series, 1993) is a vector that is computed by the front end of a speech recognition system from the log-spectrum of a segment of speech waveform samples (usually this segment is about 100 ms long). The stream of cepstra corresponding to a speech utterance is typically computed from successive overlapping segments of the speech waveform samples (usually the shift between two adjacent segments is about 10 ms). Assuming that $x^A(t)$ is the vector of cepstral features of the noisy speech signal observed at time t, and that $y^A(t)$ is the unknown vector of cepstral features of the speech signal that would have been observed in the absence of noise—hereafter referred to as the clean speech—there is broadly contemplated in connection with AVCDCN the approximation of $y^A(t)$ with its expected value $E(y^A(t)|x^{AV}(t))$ given the observed vector of audio-visual features $x^{AV}(t)$:

$$E(y^A(t)|x^{AV}(t)) = \int_{y^A} y^A p(y^A|x^{AV}(t)) dy^A$$

A significant feature of AVCDCN the use of the visual modality to estimate more accurately the posterior distribution of the clean speech features as $p(y^A|x^{AV}(t))$, whereas conventional audio-only non linear enhancement techniques generally estimate the posterior distribution of the clean speech features as $p(y^A|x^A(t))$.

Figure 1:
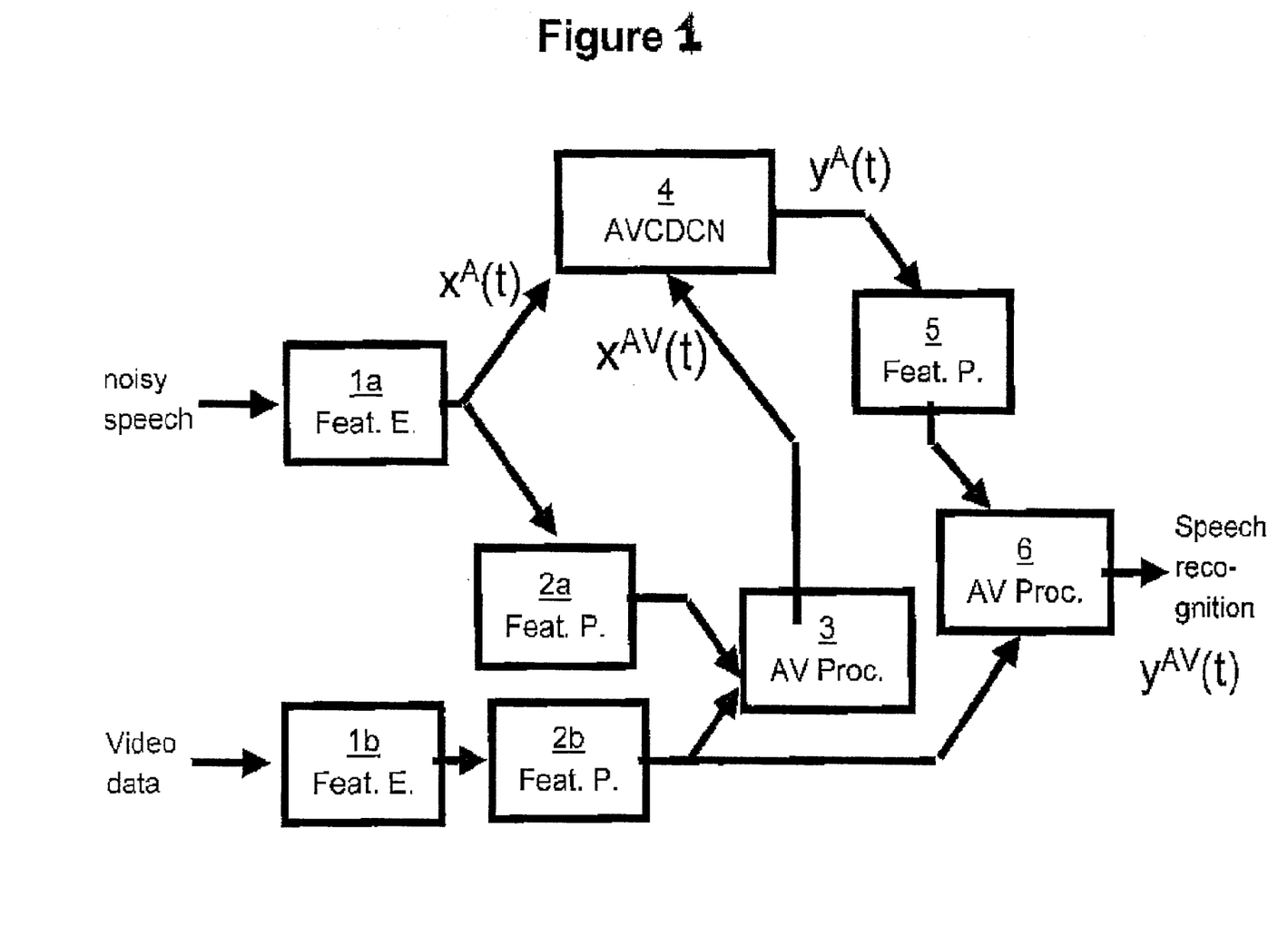
FIG. 1 schematically illustrates a model which underlies an audio-visual approach to speech enhancement.

FIG. 1 shows a presently contemplated speech enhancement scheme integrated into an overall speech recognition procedure, in accordance with a preferred embodiment of the present invention. Audio features are extracted from the input noisy speech waveform (step 1a in FIG. 1) and visual features are extracted from the input video data (step 1b). The audio features are normalized and further processed (typical feature processing techniques include the computation of dynamic features and possibly the application of a feature space transform) (step 2a). The visual features are normalized and further processed (step 2b). The normalized audio and visual features are concatenated and processed (step 3). The resulting audio-visual features are used by AVCDCN to enhance the non-normalized noisy audio features (step 4). The enhanced audio features output by AVCDCN are normalized and further processed (step 5). The enhanced and normalized audio features and the normalized visual features are concatenated and processed (step 6). The resulting audio-visual features are input to the speech recognition system.

Figure 2:
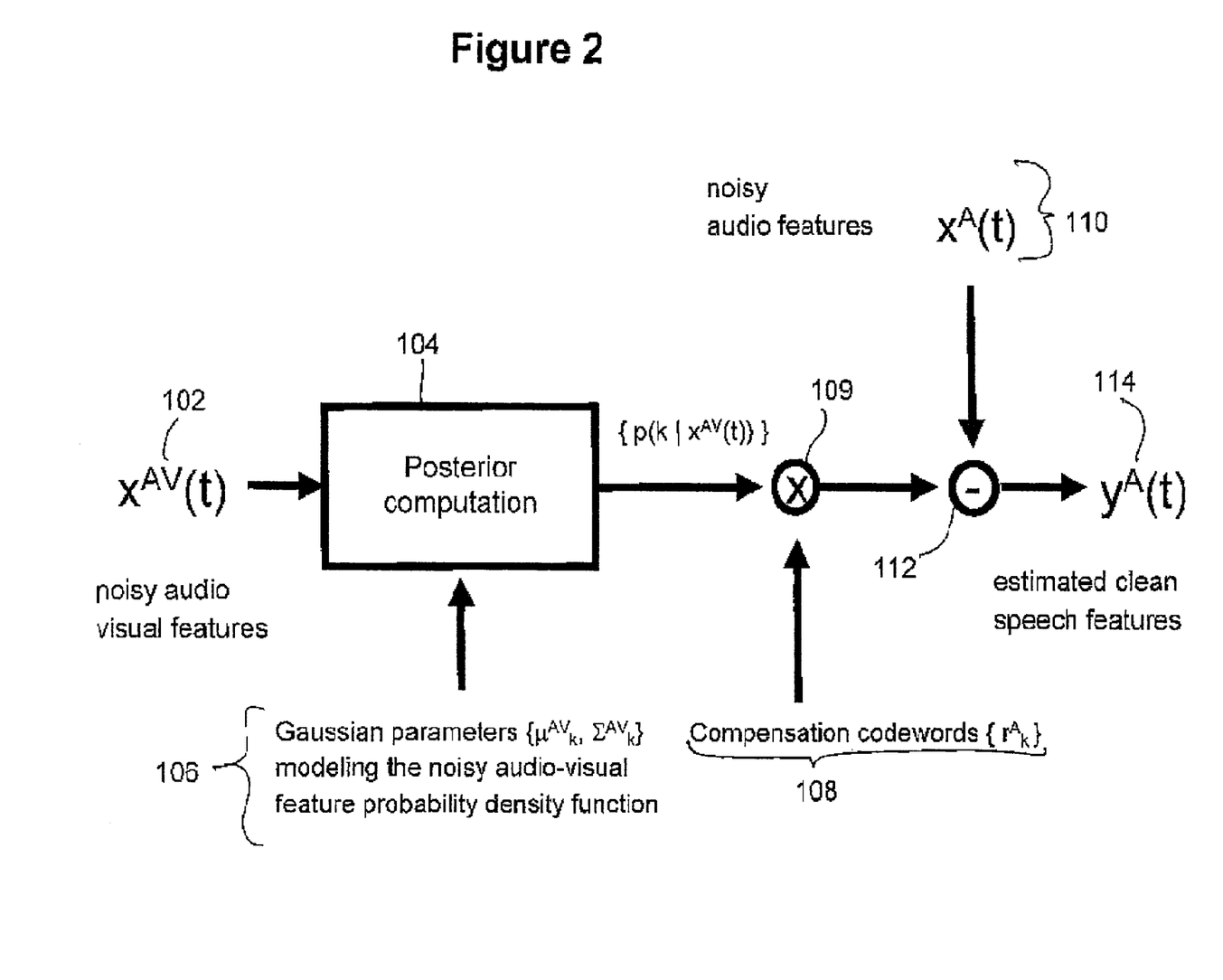
FIG. 2 schematically illustrates how AVCDCN operates on the stream of noisy audio-visual features and on the stream of noisy audio features to provide an estimate of the clean audio features.

FIG. 2 illustrates a presently contemplated concept of AVCDCN, in accordance with a preferred embodiment of the present invention. Assuming that $x^A(t)$ (at 110) is the cepstral vector of the noisy speech signal observed at time t, and that $y^A(t)$ (at 114) is the desired cepstral vector of clean speech, an objective here of AVCDCN is to provide an estimate $\ddot{y}^A(t)$ of $y^A(t)$ from the observed noisy audio features $x^A(t)$ and from the observed noisy audio-visual features $x^{AV}(t)$ (at 102). Particularly, an objective of AVCDCN here is to estimate $y^A(t)$ as its expected value $\ddot{y}^A(t)$ given $x^{AV}(t)$:

$$\ddot{y}^A(t) = \int_{y^A} y^A p(y^A | x^{AV}(t)) dy^A \quad (1)$$

Assuming that n(t) is the cepstral vector of the unknown noise signal corrupting the speech at time t, it is known that:

$$y^A(t) = x^A(t) - r(y^A(t), n(t)) \quad (2)$$

with r being a non linear function of both the unknown clean speech cepstra and the noise (See A. Acero and R. M. Stern, "Environmental robustness in automatic speech recognition", Proceedings of ICASSP'90, pages 849-852, 1990). Replacing $y^A$ in equation (1) by $y^A$ given by equation (2):

$$\ddot{y}^A(t) = x^A(t) - \int_{y^A} r(y^A(t), n(t)) p(y^A | x^{AV}(t)) dy^A \quad (3)$$

For lack of being able to compute $r(y^A(t), n(t))$ since the noise n(t) corrupting the speech is not known, and to avoid computing an integral over the space of clean speech cepstra $y^A$, AVCDCN approximates equation (3) with a sum computed over a pre-defined codebook of K audio compensation terms $\{r_k^A\}_{k=1}^{k=K}$:

$$\ddot{y}^A(t) = x^A(t) - \Sigma_{k=1}^{k=K} r_k^A p(k | x^{AV}(t)) \quad (4)$$

The application of AVCDCN as defined by equation (4) involves the estimation of a set of audio compensation codewords $\{r_k^A\}_{k=1}^{k=K}$ (at 108) and an associated posterior distribution $\{p(k|x^{AV}(t))\}_{k=1}^{k=K}$ (at 104). As shown, the multiplication of these components takes place at 109 in FIG. 2, while the overall subtraction contemplated in equation (4) takes place at 112 in FIG. 2

With continued reference to FIG. 2, the disclosure now turns to a general overview of a procedure that may be employed in accordance with at least one embodiment of the present invention.

The posterior distribution $\{p(k|x^{AV}(t))\}_{k=1}^{K}$ is preferably computed at 104 by assuming that the probability density function (pdf) of the random variable $x^{AV}$ is a mixture of Gaussians (at 106) with priors, means and covariances $\{\pi_k^{AV}, \mu_k^{AV}, \Sigma_k^{AV}\}_{k=1}^{K}$ so that by using Bayes rule:

$$p(k|x^{AV}(t)) = \frac{\pi_k^{AV} N(x^{AV}(t); \mu_k^{AV}, \Sigma_j^{AV})}{\sum_{j=1}^{K} \pi_j^{AV} N(x^{AV}(t), \mu_j^{AV}, \Sigma_j^{AV})} \quad (5)$$

Where $N(x^{AV}(t); \mu_j^{AV}, \Sigma_j^{AV})$ refers to the Gaussian pdf. In at least one embodiment of the present invention, both the codebook of audio compensations and the pdf parameters of the noisy audio-visual features are estimated from a stereo training database the includes clean audio features $(y^A(t))_{t=1}^T$ in the first channel and of noisy audio-visual $(x^{AV}(t))_{t=1}^T$ in the second channel. The noisy audio data in the second channel are generated by adding noise to the waveform of the clean audio features contained in the first channel.

The audio compensations are computed by minimizing the expected square error between $y^A$ and $x^A$ over the stereo training database:

$$r_k^A = \frac{\sum_{t=1}^{T} (x^A(t) - y^A(t)) p(k | \acute{y}^A(t))}{\sum_{t=1}^{T} p(k | \acute{y}^A(t))} \quad (6)$$

and Maximum Likelihood (ML) estimates of the means and covariances of the noisy audio-visual features are computed as (assuming equal priors):

$$\mu_k^{AV} = \frac{\sum_{t=1}^{T} x^{AV}(t) p(k | \acute{y}^A(t))}{\sum_{t=1}^{T} p(k | \acute{y}^A(t))} \quad (7)$$

$$\Sigma_k^{AV} = \frac{\sum_{t=1}^{T} x^{AV}(t) x^{AV}(t)^* p(k | \acute{y}^A(t))}{\sum_{t=1}^{T} p(k | \acute{y}^A(t))} - (\mu_k^{AV})^2 \quad (8)$$

where ★ denotes transposition. n equations (6), (7) and (8) the posteriors $p(k|\acute{y}^A(t))$ are computed using clean audio features $\acute{y}^A(t)$ obtained from a front end that can possibly be different from the front end used to computed the clean audio features referred to as $y^A(t)$, hence the difference of notation. The pdf of the clean audio features $\acute{y}^A(t)$ is modeled with a mixture of Gaussians the priors, means and covariances of which are estimated according to a ML criterion with a standard expectation-maximization algorithm on the clean audio training data $\acute{y}^A(t)$.

Elaborating now on a preferred method of employing at least one embodiment of the invention, as pointed out heretofore, an AVCDCN scheme in accordance with at least one embodiment of the present invention makes use of a front end that produces both a stream of audio-only feature vectors (the noisy features $x^A(t)$, the clean features $y^A(t)$) or $\acute{y}^A(t)$) and a stream of audio-visual feature vectors $x^{AV}(t)$ for use in equation (4), (5), (6), (7), and (8),. The noisy audio-only feature vectors $x^A(t)$ and the clean audio-only feature vectors $y^A(t)$ used in equation (4) and (6) are cepstral vectors (see chapter 3 in L. Rabiner and B. H. Juang, *Fundamentals of Speech Recognition*, Prentice Hall Signal Processing Series, 1993) of dimension 13 that are not normalized. The clean audio-only feature vectors $\acute{y}^A(t)$ used during the off-line training procedure in equation (6), (7) and (8) are obtained by normalizing and further processing the cepstra $y^A(t)$ (typical processing techniques include the computation of dynamic features and possibly also the application of a feature space transform aiming at improving the discriminability of speech features).

The noisy audio-visual feature vectors $x^{AV}(t)$ are computed by combining noisy audio-only features computed the same way as $\acute{y}^A(t)$ (i.e. Normalized and further processed) and visual features. The visual features are extracted from the video data and are combined with the audio features following the AV-HiLDA procedure explained in G. Potamianos, C. Neti and J. Luettin, "Hierarchical discriminant features for audio-visual LVCSR", Proceedings of ICASSP'01, 2001.

As will be seen herebelow, experiments were conducted with codebooks of different sizes. As far as the test data are concerned, a codebook of 128 codewords appears to correspond to an optimal trade-off between recognition accuracy and complexity. Smaller codebooks (down to 16 codewords), leading to further reduced computation requirements, still provide significant improvement of the recognition accuracy over audio-visual speech recognition at low SNRs.

The disclosure now turns to an evaluation of an embodiment of the invention as employed in the context of speech recognition, where the noise corrupting the speech is non stationary babble noise. The evaluation protocol is first explained, and then the recognition scores, obtained with the AVCDCN scheme according to an embodiment of the invention or with its audio-only counterpart scheme or without enhancement scheme are compared in combination with either audio-only or audio-visual speech recognition.

The experiments are performed on an audio-visual corpus of 50 subjects uttering connected digit sequences. The video contains the full frontal subject face in color, has a frame size of 704×480 pixels, is captured interlaced at a rate of 30 Hz (60 fields per second are available at half the vertical resolution), and is MPEG-2 encoded at a compression ratio of about 50:1. The audio is captured at 16 kHz in an office environment at a 19.5 dB SNR. The corpus is partitioned into training (5,490 utterances, 8 hours, 50 subjects) and test (529 utterances, 0.46 hour, 50 subjects) sets for multispeaker recognition, i.e. test speakers are also present in training. Non-stationary speech babble noise is artificially added to the audio channel at various SNR values. A set of audio compensation codewords and the pdf parameters characterizing the noisy audio-visual speech (resp. the noisy audio-only speech in the case of audio-only CDCN) are estimated, for each SNR condition, according to equations (6), (7) and (8) and as explained heretofore. The noisy audio-features sent to the speech recognition system are either:

(A) enhanced with the AVCDCN scheme according to equation (4); or (B) enhanced with AVCDCN's audio-only counterpart scheme according to equation (9):

$$\hat{y}^A(t) = x^A(t) - \Sigma_{k=1}^{k=K} r_k^A p(k|x^A(t)) \quad (9)$$

where the posterior distribution $\{p(k|x^A(t))\}_{k=1}^{K}$ is computed by assuming that the probability density function (pdf) of the random variable $x^A$ is a mixture of Gaussians with priors, means and covariances $\{\pi_k^A, \mu_k^A, \Sigma_k^A\}_{k=1}^{K}$ so that by using Bayes rule:

$$p(k|x^A(t)) = \frac{\pi_k^A N(x^A(t); \mu_k^A, \Sigma_k^A)}{\sum_{j=1}^{K} \pi_j^A N(x^A(t); \mu_j^A, \Sigma_j^A)} \quad (10)$$

where $N(x^A(t); \mu_j^A, \Sigma_j^A)$ refers to the Gaussian pdf; or (C) not enhanced The AVCDCN and CDCN enhancement strategies are evaluated for various sizes of codebooks across all SNR levels with both audio and audio-visual speech recognition. This is benchmarked against audio and audio-visual speech recognition without enhancement. All the speech recognition systems (with the audio and audio-visual front ends) in the experiments use a set of speaker-independent acoustic models (159 subphones covering the phonetics of English) with about 3,200 context-dependent gaussians (phonetic contexts tied by using a decision tree) (see L. R. Bahl et al., Performance of the IBM Large Vocabulary Continuous Speech Recognition System on the ARPA Wall Street Journal Task, Proceedings of ICASSP 1995, volume 1, pp. 41-44, 1995).

Figure 3:
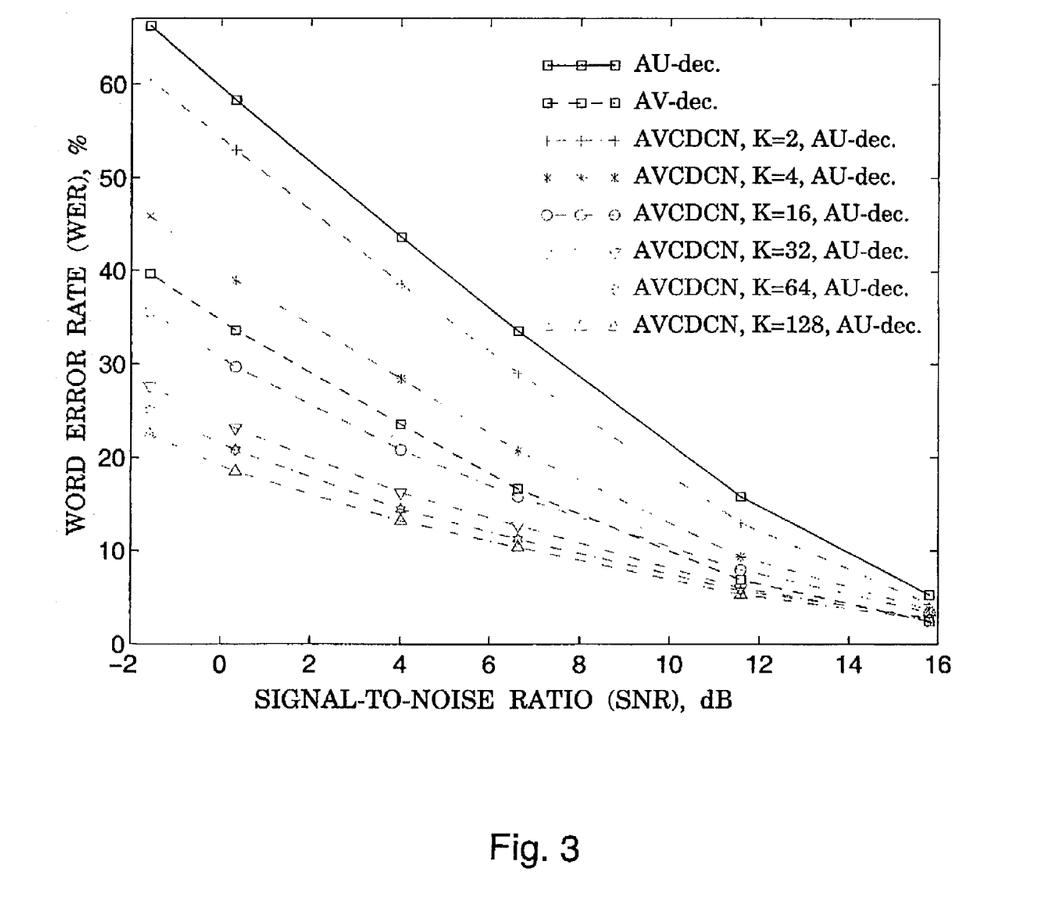
FIGS. 3 and 4 are graphs illustrating the performance of AVCDCN in terms of Word Error Rates (WERs) obtained on test sets.
Figure 4:
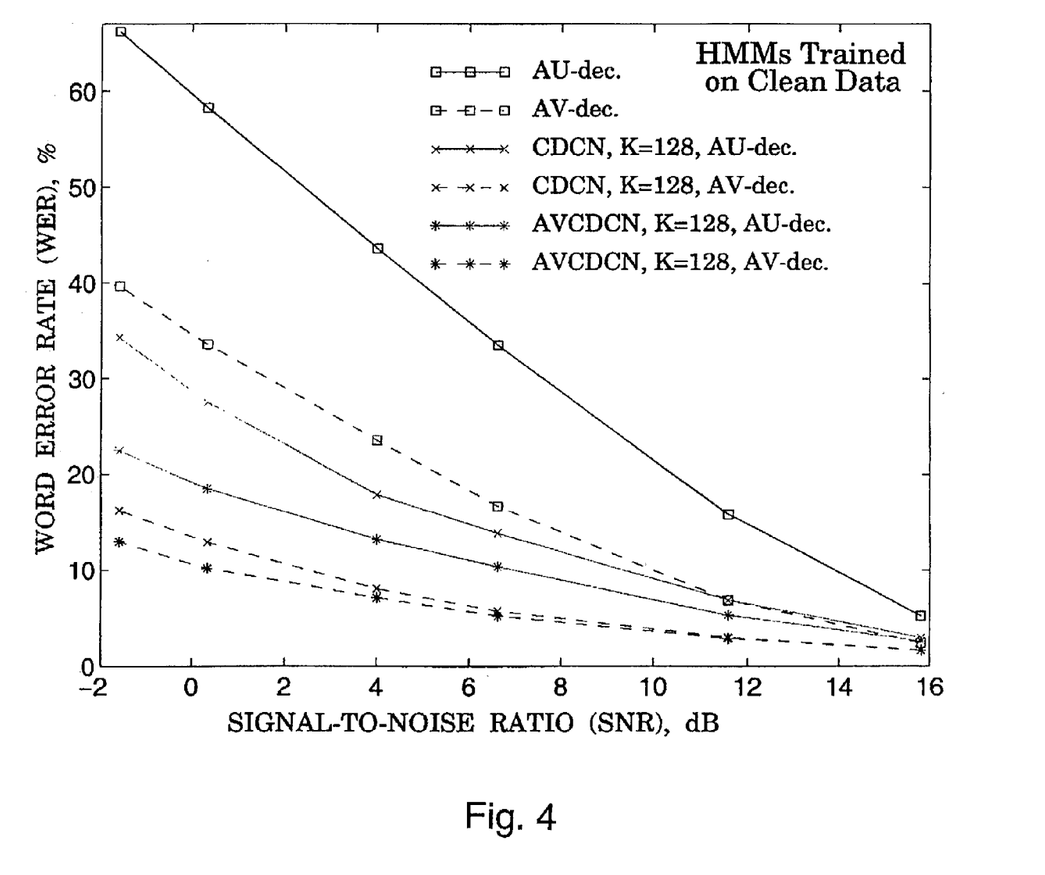

Word Error Rates (WERs) obtained on the test set are plotted as a function of the SNR in FIGS. 3 and 4.

FIG. 3 shows how the WERs obtained with AVCDCN in an audio-only speech recognition scheme decreases consistently at all SNR values when the size of the codebook is increased from K=2 to K=128 codewords. On the same figure are also plotted the WERs obtained in an audio-only and audio-visual speech recognition scheme without enhancing the features. AVCDCN outperforms the audio-only speech recognition scheme regardless of the size of the codebook, and most interestingly, AVCDCN outperforms also the audio-visual speech recognition scheme for codebooks of at least 16 codewords.

FIG. 4 compares AVCDCN and its audio-only counterpart enhancement scheme in both audio and audio-visual speech recognition schemes. To maintain the clarity of the figures, only the WERs obtained with codebooks of 128 codewords are plotted, but the conclusions drawn here apply for all sizes of codebook. AVCDCN performs significantly better than its audio-only counterpart in both the audio and audio-visual speech recognition schemes. Also, the performance gains obtained with AVCDCN and with audio-visual speech recognition add up since AVCDCN combined with audio-visual speech recognition significantly outperforms both audio-visual speech recognition, and, AVCDCN combined with audio-only speech recognition.

It is to be understood that the present invention, in accordance with at least one presently preferred embodiment, includes a first input medium which obtains noisy audio-visual features, a second input medium which obtains noisy audio features related to the noisy audio-visual features, and an arrangement for yielding enhanced audio features towards the provision of enhanced audio-visual features for speech recognition. Together, these elements may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus for enhancing speech for speech recognition, said apparatus comprising:
   a first input medium which obtains noisy audio-visual features;
   a second input medium which obtains noisy audio features related to the noisy audio-visual features; and
   a cepstral speech function output arrangement for combining the first and second inputs to yield enhanced audio features that are re-combined with visual features to yield enhanced audio-visual features used for speech recognition.

2. The apparatus according to claim 1, wherein said arrangement for yielding enhanced audio features is adapted to yield estimated clean speech features.

3. The apparatus according to claim 1, wherein said arrangement for yielding enhanced audio features comprises an arrangement for determining a posterior distribution based on the noisy audio-visual features.

4. The apparatus according to claim 3, wherein said arrangement for determining a posterior distribution is adapted to determine a posterior distribution based additionally on Gaussian parameters which model a probability density function related to the noisy audio-visual features.

5. The apparatus according to claim 1, wherein said arrangement for yielding enhanced audio features comprises an arrangement for estimating audio compensation codewords.

6. The apparatus according to claim 1, wherein said arrangement for yielding enhanced audio features comprises an arrangement for determining the difference between the noisy audio features and modified noisy audio-visual features.

7. The apparatus according to claim 1, wherein said arrangement for yielding enhanced audio features comprises:
an arrangement for determining a posterior distribution based on the noisy audio-visual features; and
an arrangement for estimating audio compensation codewords.

8. The apparatus according to claim 7, wherein said arrangement for yielding enhanced audio features comprises an arrangement for effecting a multiplication of the posterior distribution with the estimated audio compensation codewords.

9. The apparatus according to claim 8, wherein said arrangement for yielding enhanced audio features comprises an arrangement for determining the difference between the noisy audio features and the multiplication of the posterior distribution with the estimated audio compensation codewords.

10. The apparatus according to claim 1, wherein said first input medium is adapted to accept noisy audio-visual features which have resulted from the processing of normalized audio features and normalized videofeatures.

11. A method of enhancing speech for speech recognition, said method comprisingthe steps of:
obtaining noisy audio-visual features;
obtaining noisy audio features related to the noisy audio-visual features; and
using a cepstral speech function operating on the noisy audio features and the noisy audio-visual features to yield enhanced audio features that are re-combined with visual features to yield enhanced audio-visual features used for speech recognition.

12. The method according to claim 11, wherein said step of yielding enhanced audio features comprises yielding estimated clean speech features.

13. The method according to claim 11, wherein said step of yielding enhanced audio features comprises determining a posterior distribution based on the noisy audio-visual features.

14. The method according to claim 13, wherein said step of determining a posterior distribution comprises determining a posterior distribution based additionally on Gaussian parameters which model a probability density function related to the noisy audio-visual features.

15. The method according to claim 11, wherein said step of yielding enhanced audio features comprises estimating audio compensation codewords.

16. The method according to claim 11, wherein said step of yielding enhanced audio features comprises determining the difference between the noisy audio features and modified noisy audio-visual features.

17. The method according to claim 11, wherein said step of yielding enhanced audio features comprises:
determining a posterior distribution based on the noisy audio-visual features; and
estimating audio compensation codewords.

18. The method according to claim 17, wherein said step of yielding enhanced audio features comprises effecting a multiplication of the posterior distribution with the estimated audio compensation codewords.

19. The method according to claim 18, wherein said step of yielding enhanced audio features comprises determining the difference between the noisy audio features and the multiplication of the posterior distribution with the estimated audio compensation codewords.

20. The method according to claim 11, wherein said step of obtaining noisy audio-visual features comprises obtaining noisy audio-visual features which have resulted from the processing of normalized audio features and normalized video features.

21. A program storage device readable by machine, tangibly embodying a program of instructions executable by the machine to perform method steps for enhancing speech for speech recognition, said method comprising the steps of:
obtaining noisy audio-visual features;
obtaining noisy audio features related to the noisy audio-visual features; and
using a cepstral speech function operating on the noisy audio features and the noisy audio-visual features to yield enhanced audio features that are re-combined with visual features to yield enhanced audio-visual features used for speech recognition.

\* \* \* \* \*